US010931134B2

(12) United States Patent
Tang et al.

(10) Patent No.: US 10,931,134 B2
(45) Date of Patent: Feb. 23, 2021

(54) CHARGING/DISCHARGING CONTROL APPARATUS

(71) Applicant: Huawei Technologies Co., Ltd., Shenzhen (CN)

(72) Inventors: Jie Tang, Xi'an (CN); Lizhou Yang, Xi'an (CN); Jie Yi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 317 days.

(21) Appl. No.: 16/042,688

(22) Filed: Jul. 23, 2018

(65) Prior Publication Data

US 2018/0351398 A1 Dec. 6, 2018

Related U.S. Application Data

(63) Continuation of application No. PCT/CN2017/071120, filed on Jan. 13, 2017.

(30) Foreign Application Priority Data

Jan. 21, 2016 (CN) .......................... 201610042115.6

(51) Int. Cl.
*H02J 7/14* (2006.01)
*B62D 5/04* (2006.01)
(Continued)

(52) U.S. Cl.
CPC ............ *H02J 7/1423* (2013.01); *B60L 50/51* (2019.02); *B60L 53/22* (2019.02); *B60L 53/24* (2019.02);
(Continued)

(58) Field of Classification Search
CPC ........ H02J 7/1423; H02J 7/1492; H02J 7/022; H02J 2207/20; H02J 7/02; H02J 2310/48;
(Continued)

(56) References Cited

U.S. PATENT DOCUMENTS

2002/0141216 A1 10/2002 Ishihara et al.
2007/0147097 A1* 6/2007 Huang .................... H02M 1/32
363/55
(Continued)

FOREIGN PATENT DOCUMENTS

CN 1379538 A 11/2002
CN 101459344 A 6/2009
(Continued)

OTHER PUBLICATIONS

Machine Translation and Abstract of Chinese Publication No. CN101814766, Aug. 25, 2010, 11 pages.
(Continued)

*Primary Examiner* — Rexford N Barnie
*Assistant Examiner* — Thai H Tran
(74) *Attorney, Agent, or Firm* — Conley Rose, P.C.

(57) ABSTRACT

A charging/discharging control apparatus includes a motor, an electric drive circuit, a source voltage sampling circuit, a charging/discharging current sampling circuit, and a control chip, where the control chip is configured to send a first pulse width modulation (PWM) drive signal to the electric drive circuit, and the first PWM drive signal instructing the electric drive circuit to store electric energy of an external power supply in an inductor of the motor and charge a battery using the electric energy stored in the inductor of the motor.

20 Claims, 10 Drawing Sheets

(51) Int. Cl.
*H02J 7/02* (2016.01)
*B60L 53/24* (2019.01)
*B60L 53/22* (2019.01)
*B60L 50/51* (2019.01)

(52) U.S. Cl.
CPC .............. *B62D 5/046* (2013.01); *H02J 7/022* (2013.01); *H02J 7/1492* (2013.01); *B60L 2210/30* (2013.01); *B60L 2210/40* (2013.01); *Y02T 10/70* (2013.01); *Y02T 10/7072* (2013.01); *Y02T 10/72* (2013.01); *Y02T 10/92* (2013.01); *Y02T 90/12* (2013.01); *Y02T 90/14* (2013.01)

(58) Field of Classification Search
CPC ........ H02J 7/0068; H02J 7/06; H02J 2007/10; B60L 53/24; B60L 53/22; B60L 50/51; B60L 2210/30; B60L 2210/40; B62D 5/046; Y02T 10/92; Y02T 10/7005; Y02T 90/14; Y02T 10/7241; Y02T 10/7072; Y02T 90/127
See application file for complete search history.

(56) References Cited

U.S. PATENT DOCUMENTS

| | | | |
|---|---|---|---|
| 2008/0061764 A1* | 3/2008 | Tae | B60L 58/22 324/72 |
| 2009/0067205 A1* | 3/2009 | Oyobe | B60K 6/445 363/98 |
| 2009/0134700 A1 | 5/2009 | Tanaka et al. | |
| 2009/0184681 A1* | 7/2009 | Kuno | B60W 10/08 320/128 |
| 2011/0012579 A1 | 1/2011 | Huang | |
| 2012/0153884 A1* | 6/2012 | Lindsey | B60L 53/12 318/500 |
| 2013/0234675 A1* | 9/2013 | King | H02J 7/02 320/163 |
| 2013/0314046 A1 | 11/2013 | Feuerstack et al. | |
| 2014/0078800 A1* | 3/2014 | Wagoner | H02M 7/53871 363/127 |

FOREIGN PATENT DOCUMENTS

| | | |
|---|---|---|
| CN | 101814766 A | 8/2010 |
| CN | 102185487 A | 9/2011 |
| CN | 103187896 A | 7/2013 |
| CN | 103338968 A | 10/2013 |
| CN | 103770656 A | 5/2014 |
| CN | 106712517 A | 5/2017 |
| CN | 107128185 A | 9/2017 |
| EP | 0493848 A2 | 7/1992 |
| EP | 0834977 A2 | 4/1998 |
| EP | 3337024 A1 | 6/2018 |
| JP | 2009296843 A | 12/2009 |
| WO | 2008074951 A1 | 6/2008 |

OTHER PUBLICATIONS

Machine Translation and Abstract of Chinese Publication No. CN102185487, Sep. 14, 2011, 8 pages.
Machine Translation and Abstract of Chinese Publication No. CN103187896, Jul. 3, 2013, 7 pages.
Machine Translation and Abstract of Chinese Publication No. CN103770656, May 7, 2014, 13 pages.
Machine Translation and Abstract of Chinese Publication No. CN107128185, Sep. 5, 2017, 18 pages.
Machine Translation and Abstract of Japanese Publication No. JP2009296843, Dec. 17, 2009, 15 pages.
Machine Translation and Abstract of International Publication No. WO2008074951, Jun. 26, 2008, 16 pages.
Foreign Communication From A Counterpart Application, PCT Application No. PCT/CN2017/071120, English Translation of International Search Report dated Mar. 29, 2017, 2 pages.
Foreign Communication From A Counterpart Application, PCT Application No. PCT/CN2017/071120, English Translation of Written Opinion dated Mar. 29, 2017, 7 pages.
Machine Translation and Abstract of European Publication No. EP0834977, Apr. 8, 1998, 14 pages.
Foreign Communication From A Counterpart Application, Chinese Application No. 201610042115.6, Chinese Office Action dated Aug. 29, 2018, 6 pages.
Foreign Communication From A Counterpart Application, European Application No. 17741002.4, Extended European Search Report dated Aug. 28, 2018, 10 pages.

* cited by examiner

Energy storage of an inductor

Electric energy feedback

Energy storage of an inductor

Battery charging

Energy storage of an inductor

Battery charging

Inductor charging in a motor

Electric energy feedback

Energy storage of an inductor

Electric energy feedback

CHARGING/DISCHARGING CONTROL APPARATUS

CROSS-REFERENCE TO RELATED APPLICATIONS

This application is a continuation of International Patent Application No. PCT/CN2017/071120 filed on Jan. 13, 2017, which claims priority to Chinese Patent Application No. 201610042115.6 filed on Jan. 21, 2016. The disclosures of the aforementioned applications are hereby incorporated by reference in their entireties.

TECHNICAL FIELD

The present disclosure relates to the field of circuit technologies, and in particular, to a charging/discharging control apparatus.

BACKGROUND

Electric vehicles have advantages such as high efficiency, energy efficiency, low noise, and zero emission, and are a development trend of new energy vehicles in the future. However, promotion of the electric vehicles is still limited by endurance mileage and charging technologies. Currently, large-capacity batteries are usually used for the electric vehicles. Although the endurance mileage of the electric vehicles may be improved, a higher requirement is proposed for electric vehicle charging. Currently, there are two common charging manners alternating current slow charging and direct current fast charging. In the alternating current slow charging manner, an alternating current is converted into a direct current using a power conversion apparatus permanently installed inside an electric vehicle, to charge a power battery of the electric vehicle. In the direct current fast charging manner, an alternating current is converted into a direct current using a power conversion apparatus permanently installed outside an electric vehicle, to directly charge a power battery of the electric vehicle.

During research, the inventor of the technical solutions finds that, in the existing alternating current slow charging solution, a car charger and an electric drive power conversion apparatus are mutually independent, and consequently, limited by vehicle space, the charger has low power, low charging efficiency, and a relatively long charging time. In the direct current fast charging solution, a power conversion apparatus has high costs and a large floor area.

SUMMARY

The present disclosure discloses a charging/discharging control apparatus to implement charging/discharging control of a battery.

A first aspect of the present disclosure provides a charging/discharging control apparatus, including a motor, an electric drive circuit, a source voltage sampling circuit, a charging/discharging current sampling circuit, and a control chip, where a U-phase connecting terminal of the motor is connected to a U-phase connecting terminal of the electric drive circuit, a V-phase connecting terminal of the motor is connected to a V-phase connecting terminal of the electric drive circuit, a W-phase connecting terminal of the motor is connected to a W-phase connecting terminal of the electric drive circuit, and a center tap of the motor is configured to connect to a first charging/discharging terminal of an external power supply, a terminal N of the electric drive circuit is configured to connect to a second charging/discharging terminal of the external power supply, a positive direct current input terminal of the electric drive circuit is configured to connect to a positive electrode of a battery, and a negative direct current input terminal of the electric drive circuit is configured to connect to a negative electrode of the battery, the charging/discharging current sampling circuit is configured to detect three-phase charging/discharging currents of the charging/discharging control apparatus, the source voltage sampling circuit is configured to detect a voltage of the external power supply, and the charging/discharging current sampling circuit and the source voltage sampling circuit are connected to the control chip, and the control chip is configured to send a first pulse width modulation (PWM) drive signal to the electric drive circuit, and the first PWM drive signal is used to instruct the electric drive circuit to store electric energy of the external power supply in an inductor of the motor and charge the battery using the electric energy stored in the inductor of the motor, or send a second PWM drive signal to the electric drive circuit, and the second PWM drive signal is used to instruct the electric drive circuit to store electric energy of the battery in an inductor of the motor and feed back electric energy to the external power supply using the electric energy stored in the inductor of the motor.

When an operating mode of the charging/discharging control apparatus is a charging mode, the control chip of the charging/discharging control apparatus obtains an input power supply type, a source voltage sampling value, and a charging current detection value, calculates the first PWM drive signal based on the input power supply type, the source voltage sampling value, an inductance value of the motor, and an error between the charging current detection value and a target charging current value, and performs closed-loop control based on the first PWM drive signal to store the electric energy of the external power supply in the inductor of the motor and then transmit the electric energy stored in the inductor of the motor to the battery, namely, charge the battery.

When an operating mode of the charging/discharging control apparatus is a discharging mode, the control chip of the charging/discharging control apparatus obtains an input power supply type, battery energy, feedback power, a source voltage sampling value, and a battery voltage sampling value, calculates the second PWM drive signal based on the battery energy, the feedback power, the source voltage sampling value, the battery voltage sampling value, an inductance value of the motor, and an error between a target discharging current value and a discharging current detection value, and performs closed-loop control based on the second PWM drive signal to store the electric energy of the battery in the inductor of the motor and then transmit the electric energy stored in the inductor of the motor to the external power supply, namely, feed back the electric energy to the external power supply.

In a possible design, the charging/discharging control apparatus further includes a battery voltage sampling circuit and a drive circuit, and the battery voltage sampling circuit is configured to detect a voltage of the battery, the battery voltage sampling circuit is connected to the control chip, the electric drive circuit is connected to the drive circuit, and the drive circuit is connected to the control chip.

In another possible design, the electric drive circuit includes a first insulated gate bipolar transistor (IGBT) module, a second IGBT module, a third IGBT module, a fourth IGBT module, a fifth IGBT module, a sixth IGBT module, and a bus capacitor, an emitter of the first IGBT module is connected to a collector of the second IGBT module to form the U-phase connecting terminal of the electric drive circuit, an emitter of the IGBT 3 is connected to a collector of the fourth IGBT module to form the V-phase connecting terminal of the electric drive circuit, and an emitter of the fifth IGBT module is connected to a collector of the sixth IGBT module to form the W-phase connecting terminal of the electric drive circuit, a collector of the first IGBT module, a collector of the third IGBT module, a collector of the fifth IGBT module, and a positive electrode of the bus capacitor are connected to form the positive direct current input terminal of the electric drive circuit, an emitter of the second IGBT module, an emitter of the fourth IGBT module, an emitter of the sixth IGBT module, and a negative electrode of the bus capacitor are connected to form the negative direct current input terminal and the terminal N of the electric drive circuit, and a gate electrode and the emitter of the first IGBT module, a gate electrode and the emitter of the second IGBT module, a gate electrode and the emitter of the third IGBT module, a gate electrode and the emitter of the fourth IGBT module, a gate electrode and the emitter of the fifth IGBT module, and a gate electrode and the emitter of the sixth IGBT module are connected to the drive circuit.

It should be noted that the external power supply connected to the charging/discharging control apparatus is a direct current power supply, and the drive circuit includes a signal isolation circuit and a power amplification circuit.

In addition, the control chip of the charging/discharging control apparatus includes at least a sampling unit and a drive unit, and the battery voltage sampling circuit, the charging/discharging current sampling circuit, and the source voltage sampling circuit are connected to the sampling unit, and the drive circuit is connected to the drive unit.

In still another possible design, the electric drive circuit includes a U-phase electric drive circuit, a V-phase electric drive circuit, and a W-phase electric drive circuit, each of the U-phase electric drive circuit, the V-phase electric drive circuit, and the W-phase electric drive circuit includes n electric drive units, the electric drive unit includes a first connecting terminal, a second connecting terminal, a control signal connecting terminal, a positive direct current input sub-terminal, and a negative direct current input sub-terminal, and n is a positive integer, the battery includes U-phase batteries, V-phase batteries, and W-phase batteries, the U-phase batteries include n battery units that are correspondingly connected to n electric drive units in the U-phase electric drive circuit, the V-phase batteries include n battery units that are correspondingly connected to n electric drive units in the V-phase electric drive circuit, and the W-phase batteries include n battery units that are correspondingly connected to n electric drive units in the W-phase electric drive circuit, a first connecting terminal of a first electric drive unit in the U-phase electric drive circuit is connected to the U-phase connecting terminal of the motor, a first connecting terminal of a first electric drive unit in the V-phase electric drive circuit is connected to the V-phase connecting terminal of the motor, and a first connecting terminal of a first electric drive unit in the W-phase electric drive circuit is connected to the W-phase connecting terminal of the motor, a second connecting terminal of an $i^{th}$ electric drive unit in the U-phase electric drive circuit is connected to a first connecting terminal of an $(i+1)^{th}$ electric drive unit in the U-phase electric drive circuit, a positive direct current input sub-terminal of the $i^{th}$ electric drive unit is connected to a positive electrode of an battery unit in the U-phase batteries of the battery, a negative direct current input sub-terminal of the $i^{th}$ electric drive unit is connected to a negative electrode of the $i^{th}$ battery unit, and i is a positive integer less than n, a second connecting terminal of a $j^{th}$ electric drive unit in the V-phase electric drive circuit is connected to a first connecting terminal of a $(j+1)^{th}$ electric drive unit in the V-phase electric drive circuit, a positive direct current input sub-terminal of the $j^{th}$ electric drive unit is connected to a positive electrode of a $j^{th}$ battery unit in the V-phase batteries of the battery, a negative direct current input sub-terminal of the $j^{th}$ electric drive unit is connected to a negative electrode of the $j^{th}$ battery unit, and j is a positive integer less than n, and a second connecting terminal of a $k^{th}$ electric drive unit in the W-phase electric drive circuit is connected to a first connecting terminal of a $(k+1)^{th}$ electric drive unit in the W-phase electric drive circuit, a positive direct current input sub-terminal of the $k^{th}$ electric drive unit is connected to a positive electrode of a $k^{th}$ battery unit in the W-phase batteries of the battery, a negative direct current input sub-terminal of the $k^{th}$ electric drive unit is connected to a negative electrode of the $k^{th}$ battery unit, and k is a positive integer less than n, a second connecting terminal of an $n^{th}$ electric drive unit in the U-phase electric drive circuit, a second connecting terminal of an $n^{th}$ electric drive unit in the V-phase electric drive circuit, and a second connecting terminal of an $n^{th}$ electric drive unit in the W-phase electric drive circuit form the terminal N of the electric drive circuit, and a control signal connecting terminal of an electric drive unit in the U-phase electric drive circuit, a control signal connecting terminal in the V-phase electric drive circuit, and a control signal connecting terminal in the W-phase electric drive circuit are connected to the control chip.

It may be understood that the electric drive unit of the charging/discharging control apparatus may further include an H-bridge inverter, a bypass switch, a drive circuit, a battery voltage sampling circuit, and an electric drive unit control chip, the H-bridge inverter includes a first IGBT module, a second IGBT module, a third IGBT module, and a fourth IGBT module, an emitter of the first IGBT module, a collector of the fourth IGBT module, and a first terminal of the bypass switch are connected to form the first connecting terminal of the electric drive unit, and an emitter of the third IGBT module, a collector of the second IGBT module, and a second terminal of the bypass switch are connected to form the second connecting terminal of the electric drive unit, the battery voltage sampling circuit is configured to detect a voltage of a battery unit connected to the electric drive unit, a gate electrode and the emitter of the first IGBT module, a gate electrode and an emitter of the second IGBT module, a gate electrode and the emitter of the third IGBT module, and a gate electrode and an emitter of the fourth IGBT module are connected to the drive circuit, and the battery voltage sampling circuit and the drive circuit are connected to the electric drive unit control chip, and the electric drive unit control chip is connected to the control chip.

In addition, the external power supply connected to the charging/discharging control apparatus is a direct current power supply or an alternating current power supply, and the electric drive unit control chip includes at least a sampling unit and a drive unit, the battery voltage sampling circuit, the charging/discharging current sampling circuit, and the source voltage sampling circuit are connected to the sampling unit, and the drive circuit is connected to the drive unit.

In some possible implementations, the charging/discharging current sampling circuit may detect the three-phase charging/discharging currents of the charging/discharging control apparatus using a Hall current sensor, or the charging/discharging current sampling circuit may detect the three-phase charging/discharging currents of the charging/discharging control apparatus using a resistor and an isolation operational amplifier.

In the embodiments of the present disclosure, the control chip of the charging/discharging control apparatus is configured to send the first PWM drive signal to the electric drive circuit, store the electric energy of the external power supply in the inductor of the motor, and charge the battery using the electric energy stored in the inductor of the motor, or the control chip is configured to send the second PWM drive signal to the electric drive circuit, store the electric energy of the battery in the inductor of the motor, and feed back the electric energy to the external power supply using the electric energy stored in the inductor of the motor. It can be learned that the charging/discharging control apparatus provided in the embodiments of the present disclosure implements charging and discharging control of the battery using the electric drive circuit. The electric drive circuit has relatively large power, thereby increasing charging/discharging power of the charging/discharging control apparatus. In addition, the motor and the control chip of the charging/discharging control apparatus share the electric drive circuit, and a car charger does not need to be independently deployed, to help reduce costs of the charging/discharging control apparatus and reduce a floor area.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
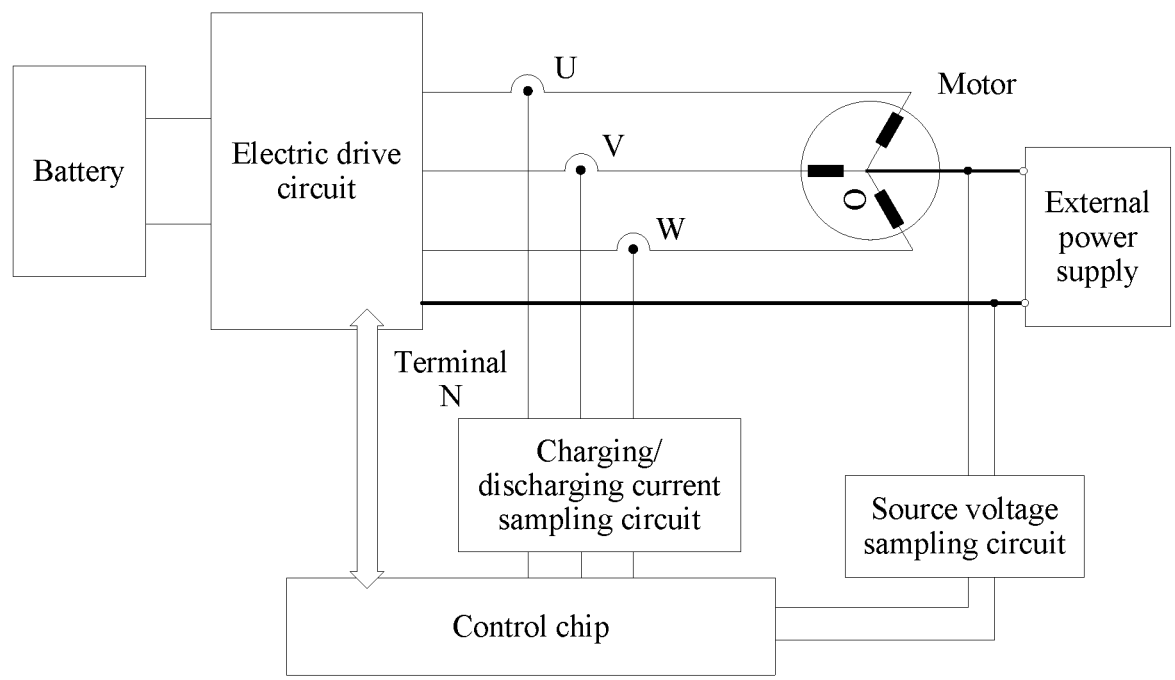
FIG. 1 is a schematic structural diagram of a charging/discharging control apparatus according to a first embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Currently, large-capacity batteries are usually used for electric vehicles. Currently, there are two common charging manners, alternating current slow charging and direct current fast charging. In the alternating current slow charging manner, an alternating current is converted into a direct current using a power conversion apparatus permanently installed inside an electric vehicle, to charge a power battery of the electric vehicle. In this manner, a car charger and an electric drive power conversion circuit are mutually independent. Limited by vehicle space, the charger has low power and a relatively long charging time. In the direct current fast charging manner, an alternating current is converted into a direct current using a power conversion apparatus permanently installed outside an electric vehicle to directly charge a power battery of the electric vehicle. In this manner, the power conversion apparatus has high costs and a large floor area.

To resolve the foregoing technical problem, this application discloses a charging/discharging control apparatus. In a charging mode, the charging/discharging control apparatus stores electric energy of an external power supply using an inductor of a motor, and transmits, using an electric drive circuit, the electric energy stored in the inductor to a battery. In a discharging mode, the charging/discharging control apparatus stores electric energy of a battery using an inductor of a motor, and then feeds back, using an electric drive circuit, the electric energy stored in the inductor to an external power supply. In this way, the charging/discharging control apparatus implements charging and discharging control of the battery using the electric drive circuit. Because the electric drive circuit has relatively large power, charging/discharging power may be increased. In addition, the motor and a control chip of the charging/discharging control apparatus share the electric drive circuit, and a car charger does not need to be independently deployed to help reduce costs of the charging/discharging control apparatus and reduce a floor area.

It should be noted that the charging/discharging control apparatus described in the embodiments of the present disclosure may be applied to a mobile vehicle such as a car, a truck, a motorcycle, a bus, a ship, a plane, a helicopter, a mower, a snow clearer, a station wagon, an amusement park vehicle, an agricultural device, a construction device, a streetcar, or a golf cart. In addition, the charging/discharging control apparatus provided in the present disclosure may also be used for a robot apparatus. Details are separately described below.

Referring to FIG. 1, FIG. 1 is a structural diagram of a charging/discharging control apparatus according to Embodiment 1 of the present disclosure. As shown in FIG. 1, the charging/discharging control apparatus may include a motor, an electric drive circuit, a source voltage sampling circuit, a charging/discharging current sampling circuit, and a control chip.

A U-phase connecting terminal of the motor is connected to a U-phase connecting terminal of the electric drive circuit, a V-phase connecting terminal of the motor is connected to a V-phase connecting terminal of the electric drive circuit, a W-phase connecting terminal of the motor is connected to a W-phase connecting terminal of the electric drive circuit, and a center tap of the motor is configured to connect to a first charging/discharging terminal of an external power supply.

A terminal N of the electric drive circuit is configured to connect to a second charging/discharging terminal of the external power supply, a positive direct current input terminal of the electric drive circuit is configured to connect to a positive electrode of a battery, and a negative direct current input terminal of the electric drive circuit is configured to connect to a negative electrode of the battery.

The charging/discharging current sampling circuit is configured to detect three-phase charging/discharging currents of the charging/discharging control apparatus, the source voltage sampling circuit is configured to detect a voltage of the external power supply, and the charging/discharging current sampling circuit and the source voltage sampling circuit are connected to the control chip.

The control chip is configured to send a first PWM drive signal to the electric drive circuit, and the first PWM drive signal is used to instruct the electric drive circuit to store electric energy of the external power supply in an inductor of the motor and charge the battery using the electric energy stored in the inductor of the motor.

Alternatively, the control chip is configured to send a second PWM drive signal to the electric drive circuit, and the second PWM drive signal is used to instruct the electric drive circuit to store electric energy of the battery in an inductor of the motor and feed back electric energy to the external power supply using the electric energy stored in the inductor of the motor.

An operating principle of the charging/discharging control apparatus shown in FIG. 1 is as follows.

When an operating mode of the charging/discharging control apparatus is set to a charging mode, the control chip of the charging/discharging control apparatus obtains an input power supply type, a source voltage sampling value, a charging current detection value, and a battery voltage sampling value, calculates the first PWM drive signal based on the input power supply type, the source voltage sampling value, the battery voltage sampling value, an inductance value of the motor, and an error between a target charging current value and the charging current detection value, and performs closed-loop control based on the first PWM drive signal, to store the electric energy of the external power supply in the inductor of the motor and then transmit the electric energy stored in the inductor of the motor to the battery, namely, charge the battery.

When an operating mode of the charging/discharging control apparatus is set to a discharging mode, the control chip of the charging/discharging control apparatus obtains an input power supply type, battery energy, feedback power, a source voltage sampling value, and a battery voltage sampling value, calculates the second PWM drive signal based on the battery energy, the feedback power, the source voltage sampling value, the battery voltage sampling value, an inductance value of the motor, and an error between a target discharging current value and a discharging current detection value, and performs closed-loop control based on the second PWM drive signal to store the electric energy of the battery in the inductor of the motor and then transmit the electric energy stored in the inductor of the motor to the external power supply, namely, feedback the electric energy to the external power supply.

Switchover of the operating mode of the charging/discharging control apparatus may be controlled in a hardware manner, or may be controlled in a software manner, or may be controlled using a combination of hardware and software. For example, switchover between the charging mode and the discharging mode of the charging/discharging control apparatus may be controlled using a high-low level conversion circuit. The switchover control of the operating mode of the charging/discharging control apparatus is not uniquely limited in this embodiment of the present disclosure.

In the charging/discharging control apparatus described in FIG. 1, the control chip of the charging/discharging control apparatus is configured to send the first PWM drive signal to the electric drive circuit, store the electric energy of the external power supply in the inductor of the motor, and charge the battery using the electric energy stored in the inductor of the motor, or the control chip is configured to send the second PWM drive signal to the electric drive circuit, store the electric energy of the battery in the inductor of the motor, and feedback the electric energy to the external power supply using the electric energy stored in the inductor of the motor. It can be learned that the charging/discharging control apparatus provided in this embodiment of the present disclosure implements charging and discharging control of the battery using the electric drive circuit. The electric drive circuit has relatively large power, thereby increasing charging/discharging power of the charging/discharging control apparatus. In addition, the motor and the control chip of the charging/discharging control apparatus share the electric drive circuit, and a car charger does not need to be independently deployed, to help reduce costs of the charging/discharging control apparatus and reduce a floor area.

Optionally, in this embodiment of the present disclosure, the charging/discharging current sampling circuit detects the three-phase charging/discharging currents of the charging/discharging control apparatus using a Hall current sensor.

Optionally, in this embodiment of the present disclosure, the charging/discharging current sampling circuit detects the three-phase charging/discharging currents of the charging/discharging control apparatus using a resistor and an isolation operational amplifier.

It may be understood that there may be various specific implementations of the charging/discharging current sampling circuit and the source voltage sampling circuit of the charging/discharging control apparatus, and this is not uniquely limited in this embodiment of the present disclosure.

Figure 2:
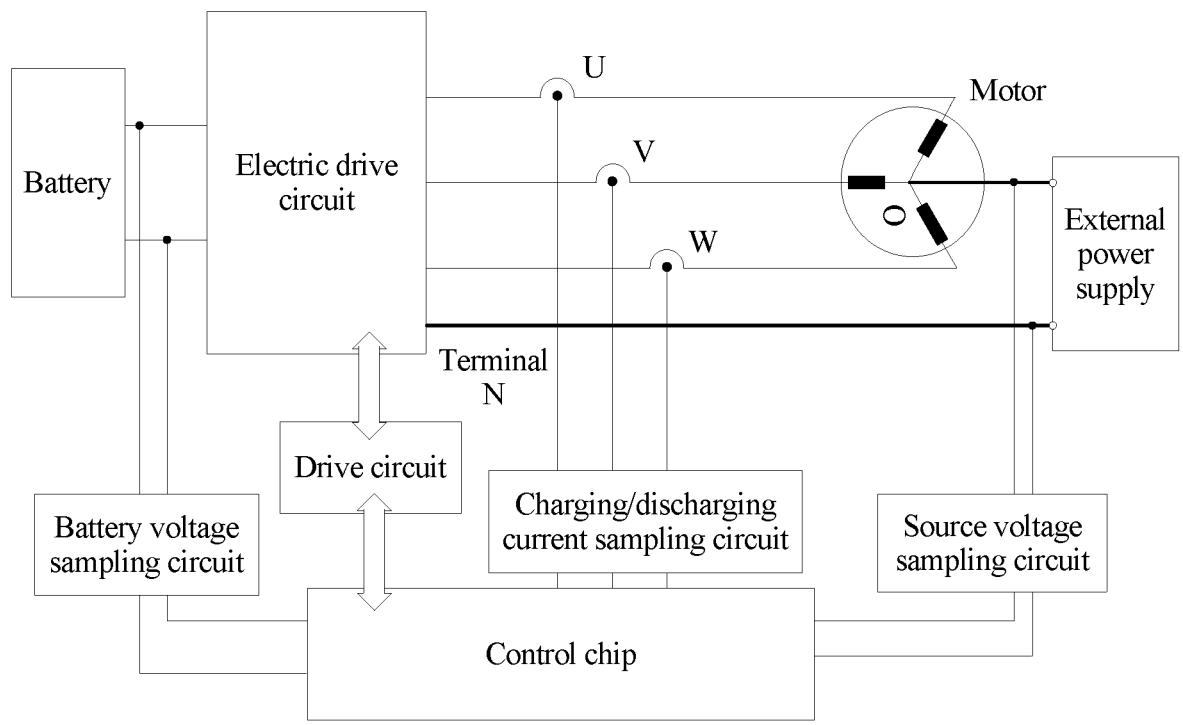
FIG. 2 is a schematic structural diagram of a charging/discharging control apparatus according to a second embodiment of the present disclosure.

Referring to FIG. 2, FIG. 2 is a structural diagram of a charging/discharging control apparatus according to a second embodiment of the present disclosure. The charging/discharging control apparatus shown in FIG. 2 is obtained by optimizing the charging/discharging control apparatus shown in FIG. 1. Compared with the charging/discharging control apparatus shown in FIG. 1, the charging/discharging control apparatus shown in FIG. 2 further includes a battery voltage sampling circuit and a drive circuit.

The battery voltage sampling circuit is configured to detect a voltage of the battery, and the battery voltage sampling circuit is connected to the control chip.

The electric drive circuit is connected to the drive circuit, and the drive circuit is connected to the control chip.

Figure 3A:
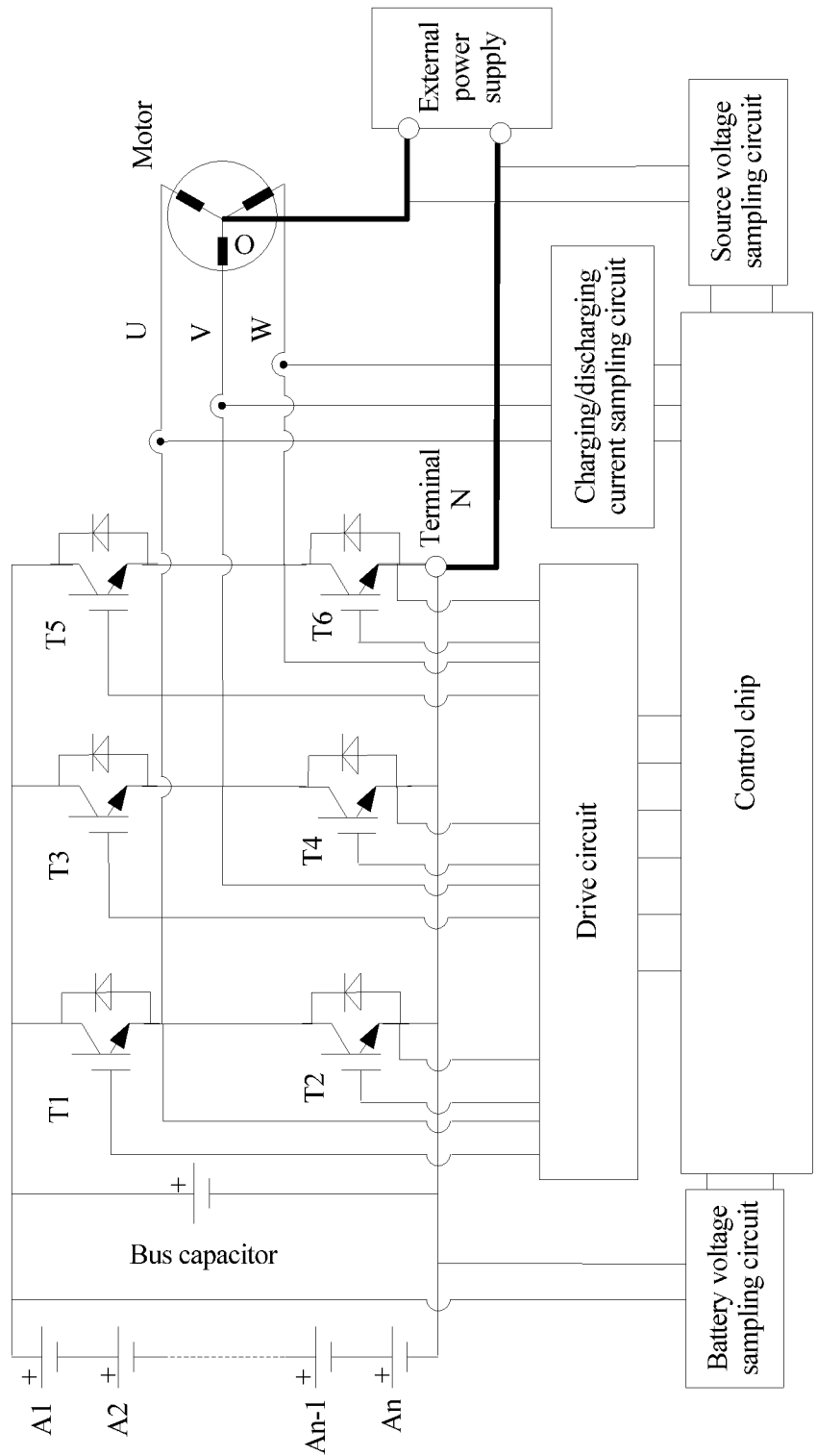
FIG. 3A is a schematic structural diagram of another charging/discharging control apparatus according to a second embodiment of the present disclosure.

Optionally, in this embodiment of the present disclosure, referring to FIG. 3A, FIG. 3A is a structural diagram of another charging/discharging control apparatus according to the second embodiment of the present disclosure.

The electric drive circuit includes a first IGBT module T1, a second IGBT module T2, a third IGBT module T3, a fourth IGBT module T4, a fifth IGBT module T5, a sixth IGBT module T6, and a bus capacitor.

An emitter of the first IGBT module T1 is connected to a collector of the second IGBT module T2 to form the U-phase connecting terminal of the electric drive circuit, an emitter of the third IGBT module T3 is connected to a collector of the fourth IGBT module T4 to form the V-phase connecting terminal of the electric drive circuit, and an emitter of the fifth IGBT module T5 is connected to a collector of the sixth IGBT module T6 to form the W-phase connecting terminal of the electric drive circuit.

A collector of the first IGBT module T1, a collector of the third IGBT module T3, a collector of the fifth IGBT module T5, and a positive electrode of the bus capacitor are connected to form the positive direct current input terminal of the electric drive circuit.

An emitter of the second IGBT module T2, an emitter of the fourth IGBT module T4, an emitter of the sixth IGBT module T6, and a negative electrode of the bus capacitor are connected to form the negative direct current input terminal and the terminal N of the electric drive circuit.

A gate electrode and the emitter of the first IGBT module T1, a gate electrode and the emitter of the second IGBT module T2, a gate electrode and the emitter of the third IGBT module T3, a gate electrode and the emitter of the fourth IGBT module T4, a gate electrode and the emitter of the fifth IGBT module T5, and a gate electrode and the emitter of the sixth IGBT module T6 are connected to the drive circuit.

Optionally, in this embodiment of the present disclosure, the external power supply is a direct current power supply.

The drive circuit includes a signal isolation circuit and a power amplification circuit.

The following describes in detail an operating principle of the charging/discharging control apparatus provided in this embodiment of the present disclosure with reference to a schematic diagram.

Figure 3B:
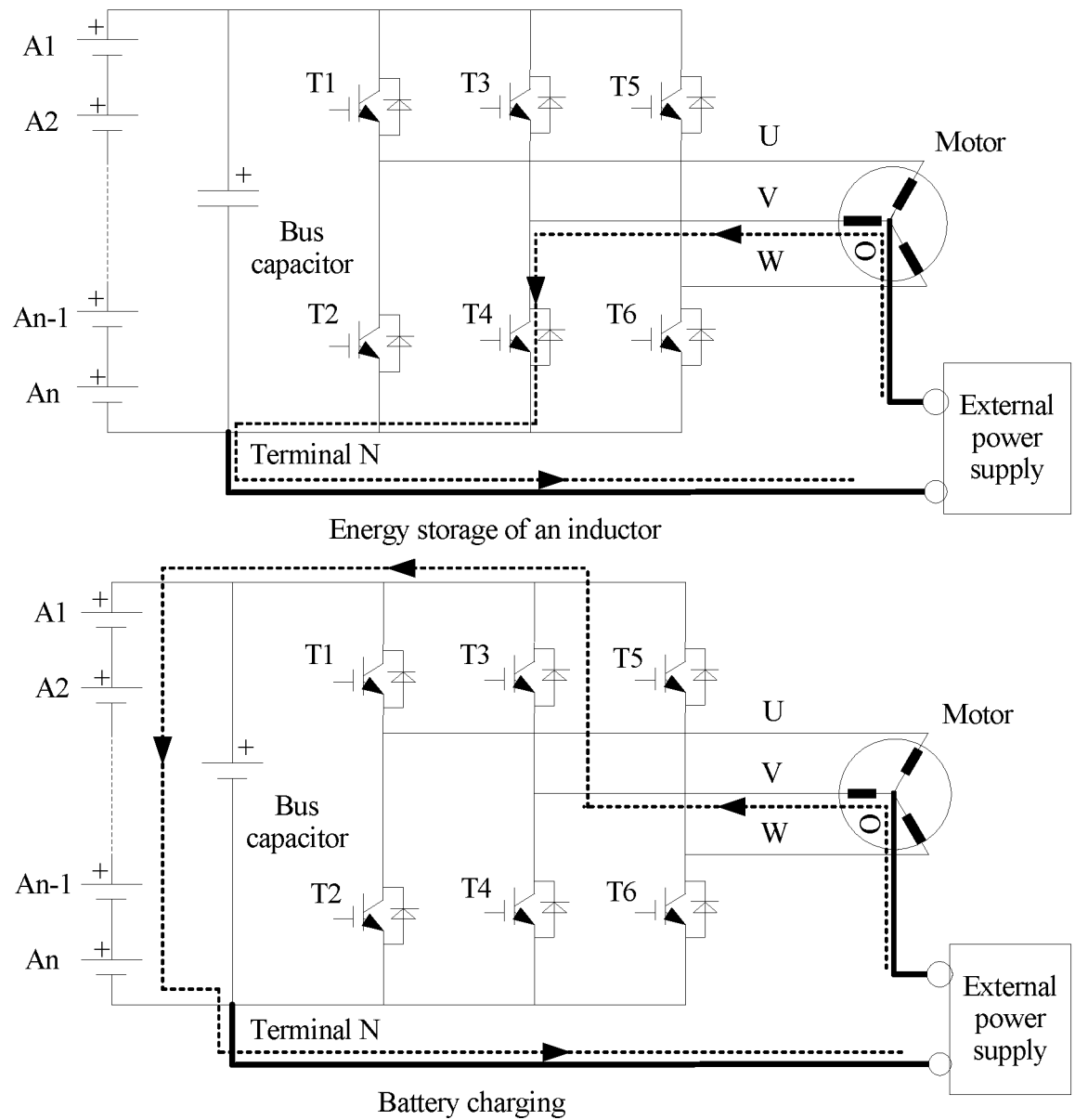
FIG. 3B is a schematic diagram of V-phase charging of a charging/discharging control apparatus according to a second embodiment of the present disclosure.

Referring to FIG. 3B, FIG. 3B is a schematic diagram of V-phase charging of the charging/discharging control apparatus according to the second embodiment of the present disclosure. When an operating mode of the charging/discharging control apparatus is a charging mode, and a direction of the external power supply is a forward direction (a forward direction of the direct current power supply), the control chip sends a first PWM drive signal to the electric drive circuit using the drive circuit, and the fourth IGBT module T4 of the electric drive circuit is backward conducted (conducted from the collector to the emitter, namely, a transistor of the IGBT module is conducted). In this case, the motor, the fourth IGBT module T4, the terminal N, and the external power supply form an energy storage loop. The external power supply charges the inductor of the motor. When it is detected that an endpoint value of a rising edge of a V-phase inductance current of the motor reaches a target value, the control chip controls the fourth IGBT module T4 to be disconnected, and controls the third IGBT module T3 of the electric drive circuit to be forward conducted (conducted from the emitter to the collector, namely, a diode of the IGBT module is forward conducted). The motor, the third IGBT module T3, the battery, the terminal N, and the external power supply form a charging loop. The inductor of the motor charges the battery.

The control chip may determine information about the external power supply such as an input direction and a type based on a sampling result of the source voltage sampling circuit. When the external power supply is a direct current power supply, a sampling result greater than 0 indicates that the input direction of the external power supply is a forward direction, and a sampling result less than 0 indicates that the input direction of the external power supply is a backward direction. When the external power supply is an alternating current power supply, a phase of a sampling result that is greater than zero degrees and less than 180 degrees indicates that the input direction of the external power supply is a forward direction, and a phase of a sampling result that is greater than 180 degrees and less than 360 degrees indicates that the input direction of the external power supply is a backward direction.

Figure 3C:
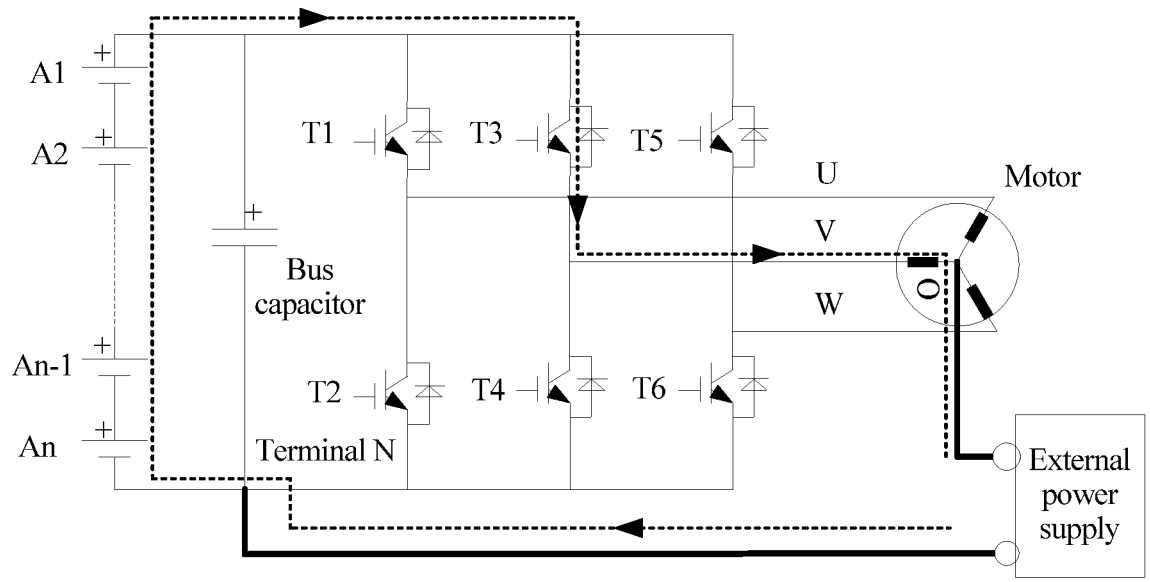
FIG. 3C is a schematic diagram of V-phase discharging of a charging/discharging control apparatus according to a second embodiment of the present disclosure.
Figure 3C:
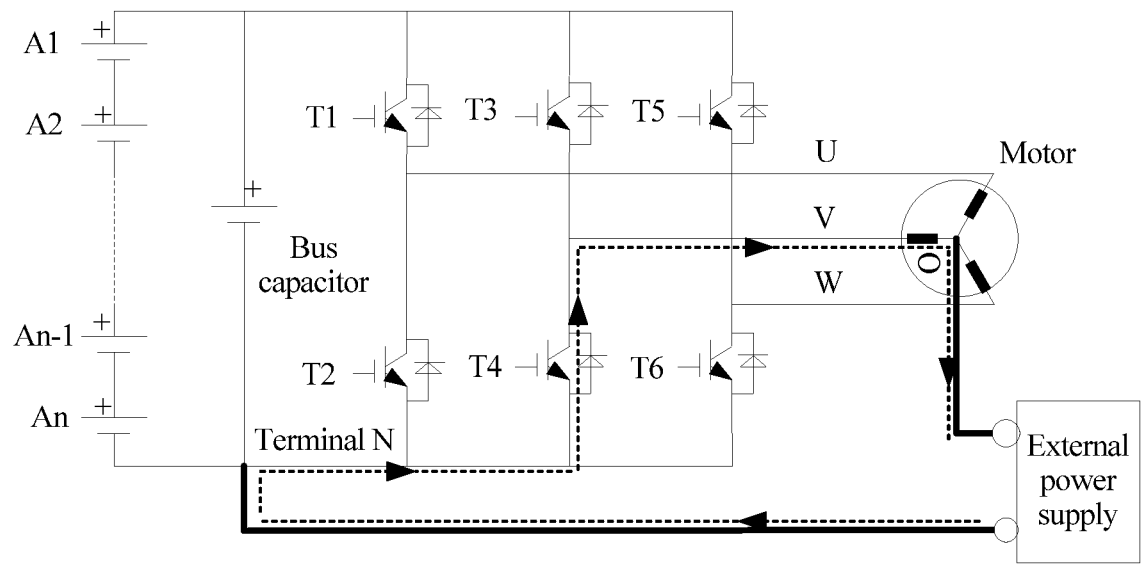

Referring to FIG. 3C, FIG. 3C is a schematic diagram of V-phase discharging of the charging/discharging control apparatus according to the second embodiment of the present disclosure. When an operating mode of the charging/discharging control apparatus is a discharging mode, and a direction of the external power supply is a forward direction (a forward direction of the direct current power supply), the control chip sends a second PWM drive signal to the electric drive circuit using the drive circuit, the third IGBT module T3 of the electric drive circuit is backward conducted, the external power supply, the terminal N, the battery, the third IGBT module T3, and the motor form an energy storage loop, and electric energy of the battery is transmitted to the inductor of the motor. When it is detected that an endpoint value of a rising edge of a V-phase inductance current of the motor reaches a target value, the control chip controls the third IGBT module T3 to be disconnected, and controls the fourth IGBT module T4 of the electric drive circuit to be forward conducted. The motor, the external power supply, the terminal N, and the fourth IGBT module T4 form a discharging loop. The inductor of the motor feeds back electric energy to the external power supply.

Optionally, in this embodiment of the present disclosure, the control chip includes at least a sampling unit and a drive unit.

The battery voltage sampling circuit, the charging/discharging current sampling circuit, and the source voltage sampling circuit are connected to the sampling unit.

The drive circuit is connected to the drive unit.

The battery may include n battery units (A1, A2, . . . , An−1, An), and n is a positive integer.

In the charging/discharging control apparatus described in FIG. 2 or FIG. 3A, the control chip of the charging/discharging control apparatus is configured to send the first PWM drive signal to the electric drive circuit, store electric energy of the external power supply in the inductor of the motor, and charge the battery using the electric energy stored in the inductor of the motor, or the control chip is configured to send the second PWM drive signal to the electric drive circuit, store the electric energy of the battery in the inductor of the motor, and feed back the electric energy to the external power supply using the electric energy stored in the inductor of the motor. It can be learned that the charging/discharging control apparatus provided in this embodiment of the present disclosure implements charging and discharging control of the battery using the electric drive circuit. The electric drive circuit has relatively large power, thereby increasing charging/discharging power of the charging/discharging control apparatus. In addition, the motor and the control chip of the charging/discharging control apparatus share the electric drive circuit, and a car charger does not need to be independently deployed to help reduce costs of the charging/discharging control apparatus and reduce a floor area.

Figure 4A:
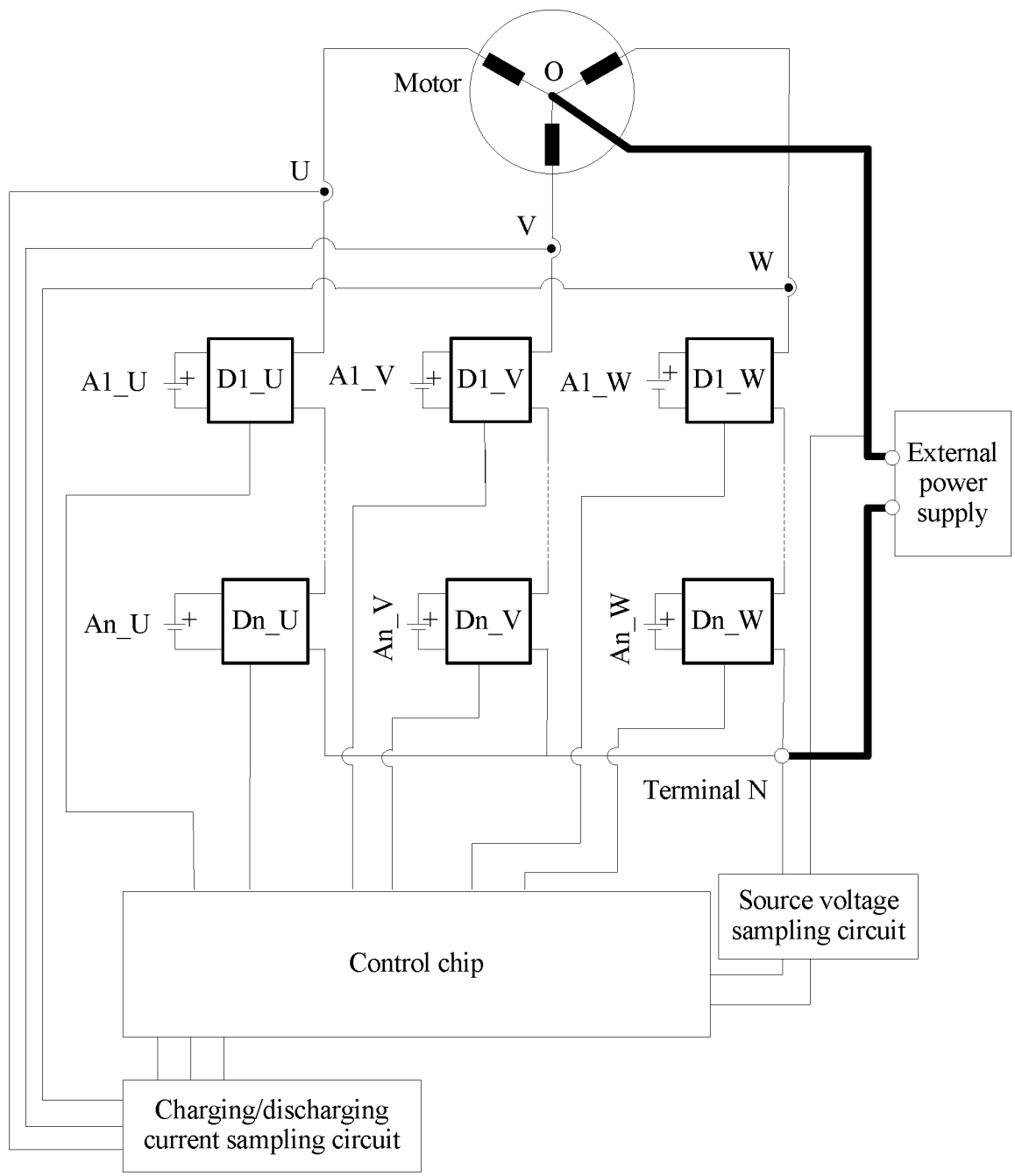
FIG. 4A is a schematic structural diagram of a charging/discharging control apparatus according to a third embodiment of the present disclosure.

Referring to FIG. 4A, FIG. 4A is a structural diagram of a charging/discharging control apparatus according to a third embodiment of the present disclosure. The charging/discharging control apparatus shown in FIG. 4A is obtained by optimizing the charging/discharging control apparatus shown in FIG. 1. In comparison with the charging/discharging control apparatus shown in FIG. 1, the charging/discharging control apparatus shown in FIG. 4A has the following differences.

The electric drive circuit includes a U-phase electric drive circuit, a V-phase electric drive circuit, and a W-phase electric drive circuit, each of the U-phase electric drive circuit, the V-phase electric drive circuit, and the W-phase electric drive circuit includes n electric drive units, the electric drive unit includes a first connecting terminal, a second connecting terminal, a control signal connecting terminal, a positive direct current input sub-terminal, and a negative direct current input sub-terminal, and n is a positive integer.

The battery includes U-phase batteries, V-phase batteries, and W-phase batteries, the U-phase batteries include n battery units that are correspondingly connected to n electric drive units in the U-phase electric drive circuit, the V-phase batteries include n battery units that are correspondingly connected to n electric drive units in the V-phase electric drive circuit, and the W-phase batteries include n battery units that are correspondingly connected to n electric drive units in the W-phase electric drive circuit.

A first connecting terminal of a first electric drive unit in the U-phase electric drive circuit is connected to the U-phase connecting terminal of the motor, a first connecting terminal of a first electric drive unit in the V-phase electric drive circuit is connected to the V-phase connecting terminal of the motor, and a first connecting terminal of a first electric drive unit in the W-phase electric drive circuit is connected to the W-phase connecting terminal of the motor.

A second connecting terminal of an $i^{th}$ electric drive unit in the U-phase electric drive circuit is connected to a first connecting terminal of an $(i+1)^{th}$ electric drive unit in the U-phase electric drive circuit, a positive direct current input sub-terminal of the $i^{th}$ electric drive unit is connected to a positive electrode of an $i^{th}$ battery unit in the U-phase batteries of the battery, a negative direct current input sub-terminal of the $i^{th}$ electric drive unit is connected to a negative electrode of the $i^{th}$ battery unit, and i is a positive integer less than n. A second connecting terminal of a $j^{th}$ electric drive unit in the V-phase electric drive circuit is connected to a first connecting terminal of a $(j+1)^{th}$ electric drive unit in the V-phase electric drive circuit, a positive direct current input sub-terminal of the $j^{th}$ electric drive unit is connected to a positive electrode of a $j^{th}$ battery unit in the V-phase batteries of the battery, a negative direct current input sub-terminal of the $j^{th}$ electric drive unit is connected to a negative electrode of the $j^{th}$ battery unit, and j is a positive integer less than n. A second connecting terminal of a $k^{th}$ electric drive unit in the W-phase electric drive circuit is connected to a first connecting terminal of a $(k+1)^{th}$ electric drive unit in the W-phase electric drive circuit, a positive direct current input sub-terminal of the $k^{th}$ electric drive unit is connected to a positive electrode of a $k^{th}$ battery unit in the W-phase batteries of the battery, a negative direct current input sub-terminal of the $k^{th}$ electric drive unit is connected to a negative electrode of the $k^{th}$ battery unit, and k is a positive integer less than n.

A second connecting terminal of an $n^{th}$ electric drive unit in the U-phase electric drive circuit, a second connecting terminal of an $n^{th}$ electric drive unit in the V-phase electric drive circuit, and a second connecting terminal of an $n^{th}$ electric drive unit in the W-phase electric drive circuit form the terminal N of the electric drive circuit.

A control signal connecting terminal of an electric drive unit in the U-phase electric drive circuit, a control signal connecting terminal in the V-phase electric drive circuit, and a control signal connecting terminal in the W-phase electric drive circuit are connected to the control chip.

Figure 4B:
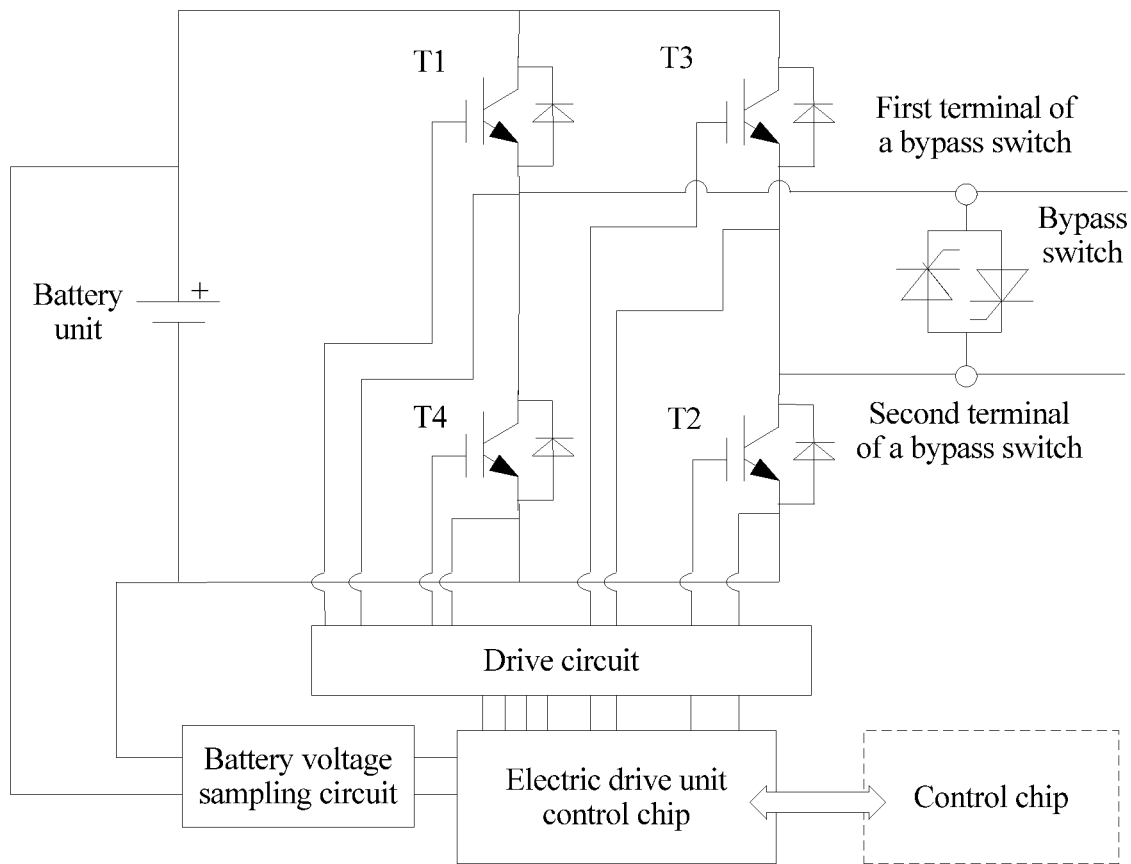
FIG. 4B is a schematic structural diagram of an electric drive unit of a charging/discharging control apparatus according to a third embodiment of the present disclosure.

Optionally, referring to FIG. 4B, FIG. 4B is a structural diagram of an electric drive unit of the charging/discharging control apparatus according to the third embodiment of the present disclosure.

The electric drive unit includes an H-bridge inverter, a bypass switch, a drive circuit, a battery voltage sampling circuit, and an electric drive unit control chip. The bypass switch is configured to bypass the electric drive unit when the electric drive unit is faulty.

The H-bridge inverter includes a first IGBT module T1, a second IGBT module T2, a third IGBT module T3, and a fourth IGBT module T4, an emitter of the first IGBT module T1, a collector of the fourth IGBT module T4, and a first terminal of the bypass switch are connected to form the first connecting terminal of the electric drive unit, and an emitter of the third IGBT module T3, a collector of the second IGBT module T2, and a second terminal of the bypass switch are connected to form the second connecting terminal of the electric drive unit.

The battery voltage sampling circuit is configured to detect a voltage of a battery unit connected to the electric drive unit.

A gate electrode and the emitter of the first IGBT module T1, a gate electrode and an emitter of the second IGBT module T2, a gate electrode and the emitter of the third IGBT module T3, and a gate electrode and an emitter of the fourth IGBT module T4 are connected to the drive circuit.

The battery voltage sampling circuit and the drive circuit are connected to the electric drive unit control chip, and the electric drive unit control chip is connected to the control chip.

The following describes in detail an operating principle of the charging/discharging control apparatus provided in this embodiment of the present disclosure with reference to a schematic diagram.

An operating principle of the charging/discharging control apparatus shown in FIG. 4A is as follows.

Figure 4C:
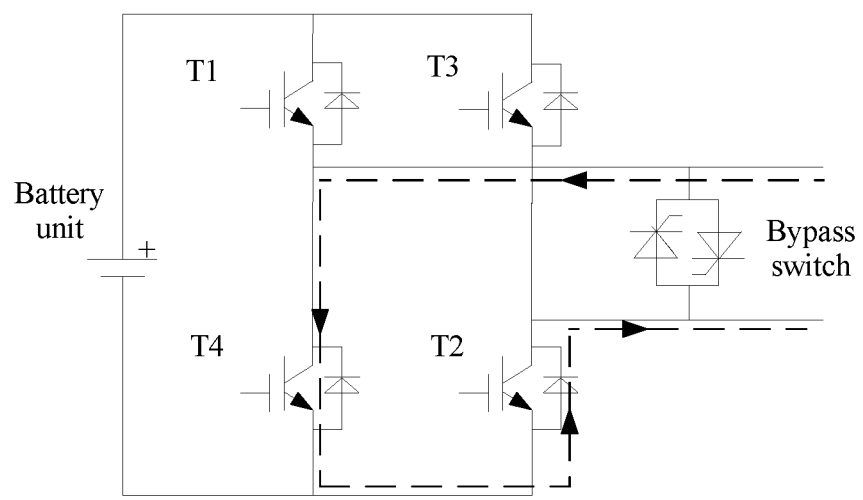
FIG. 4C is a schematic diagram of V-phase charging of a charging/discharging control apparatus when an external power supply is forward connected to according to a third embodiment of the present disclosure.
Figure 4C:
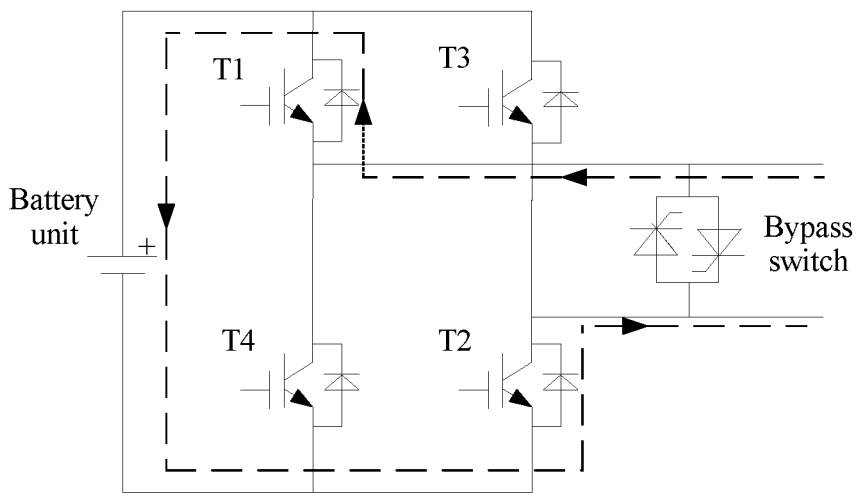

Referring to FIG. 4C, FIG. 4C is a schematic diagram of V-phase charging of the charging/discharging control apparatus when the external power supply is forward connected to according to the third embodiment of the present disclosure. When an operating mode of the charging/discharging control apparatus is a charging mode, and a direction of the external power supply is a forward direction, the control chip sends a first PWM drive signal to the n electric drive units in the V-phase electric drive circuit of the electric drive circuit. A fourth IGBT module T4 of the n electric drive units is backward conducted (conducted from a collector to an emitter, namely, a transistor of the IGBT module is conducted). A second IGBT module T2 of the n electric drive units is forward conducted (conducted from an emitter to a collector, namely, a diode of the IGBT module is forward conducted). The motor, the fourth IGBT module T4 and the second IGBT module T2 of the n electric drive units, the terminal N, and the external power supply form an energy storage loop. The external power supply stores energy in the inductor of the motor. When it is detected that an endpoint value of a rising edge of a V-phase inductance current of the motor reaches a target value, the control chip disconnects the fourth IGBT module T4 of the n electric drive units, and a first IGBT module T1 and the second IGBT module T2 of the n electric drive units are forward conducted. The motor, the n battery units corresponding to the n electric drive units, the first IGBT module T1 and the second IGBT module T2 of the n electric drive units, the terminal N, and the external power supply form a charging loop. The inductor of the motor charges the battery unit.

Figure 4D:
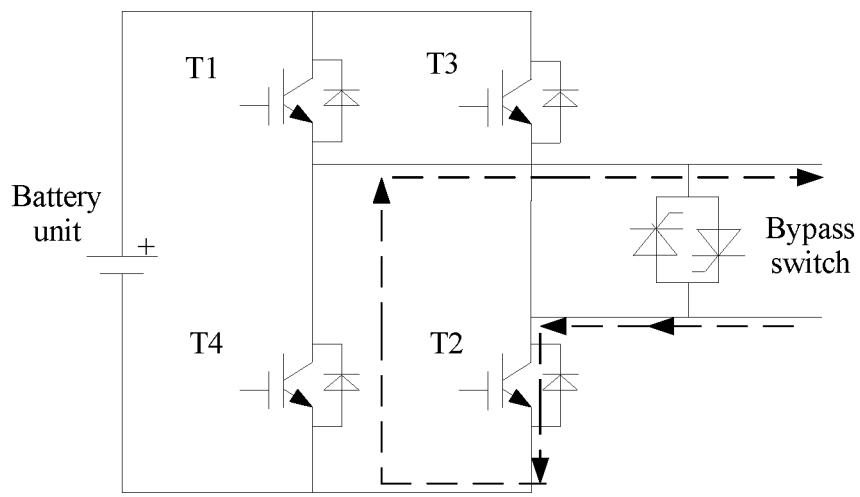
FIG. 4D is a schematic diagram of V-phase charging of a charging/discharging control apparatus when an external power supply is backward connected to according to a third embodiment of the present disclosure.
Figure 4D:
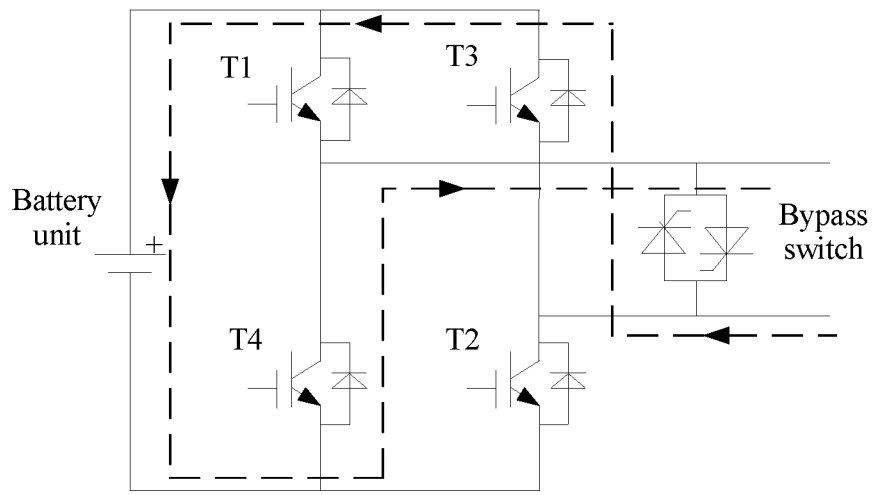

Referring to FIG. 4D, FIG. 4D is a schematic diagram of V-phase charging of the charging/discharging control apparatus when the external power supply is backward connected to according to the third embodiment of the present disclosure. When an operating mode of the charging/discharging control apparatus is a charging mode, and a direction of the external power supply is a backward direction, the control chip sends a first PWM drive signal to the n electric drive units in the V-phase electric drive circuit of the electric drive circuit. A second IGBT module T2 of the n electric drive units is backward conducted. A fourth IGBT module T4 of the n electric drive units is forward conducted. The external power supply, the terminal N, the second IGBT module T2 and the fourth IGBT module T4 of the n electric drive units, and the motor form an energy storage loop. The external power supply stores energy in the inductor of the motor. When it is detected that an endpoint value of a rising edge of a V-phase inductance current of the motor reaches a target value, the control chip disconnects the second IGBT module T2 of the n electric drive units, and a third IGBT module T3 and the fourth IGBT module T4 of the n electric drive units are forward conducted. The external power supply, the third IGBT module T3 of the n electric drive units, the n battery units corresponding to the n electric drive units, the fourth IGBT module T4 of the n electric drive units, the terminal N, and the motor form a charging loop. The inductor of the motor charges the n battery units corresponding to the n electric drive units.

Figure 4E:
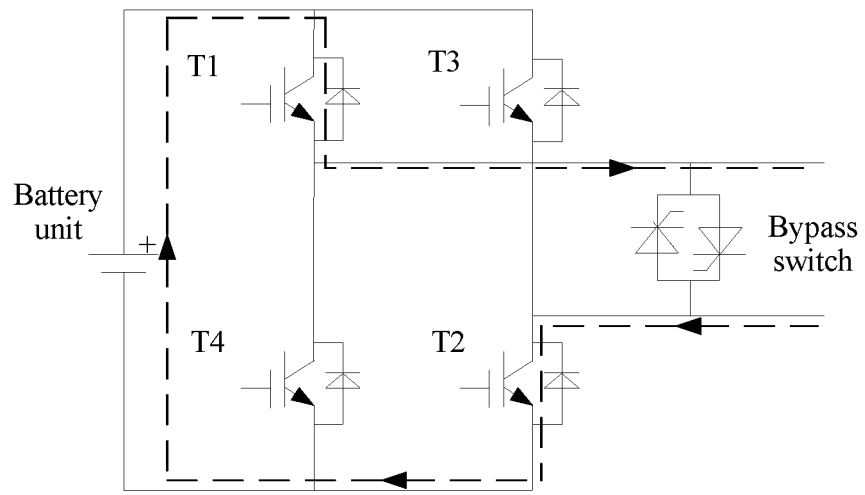
FIG. 4E is a schematic diagram of V-phase discharging of a charging/discharging control apparatus when an external power supply is forward connected to according to a third embodiment of the present disclosure.
Figure 4E:
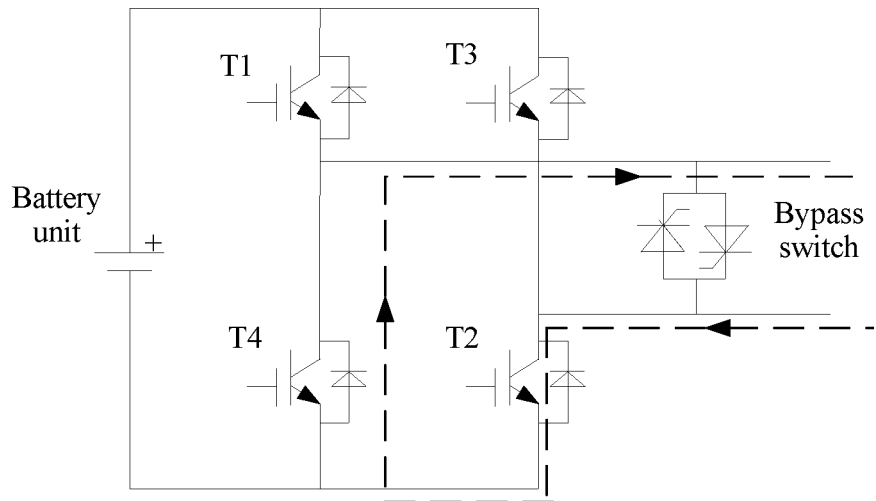

Referring to FIG. 4E, FIG. 4E is a schematic diagram of V-phase discharging of the charging/discharging control apparatus when the external power supply is forward connected to according to the third embodiment of the present disclosure. When an operating mode of the charging/discharging control apparatus is a discharging mode, and a direction of the external power supply is a forward direction, the control chip sends a PWM discharging drive signal to the n electric drive units in the V-phase electric drive circuit of the drive circuit. A first IGBT module T1 and a second IGBT module T2 of the n electric drive units are backward conducted. The external power supply, the terminal N, the second IGBT module T2 of the n electric drive units, the n battery units corresponding to the n electric drive units, the first IGBT module T1 of the n electric drive units, and the motor form an energy storage loop. The n battery units corresponding to the n electric drive units store energy in the inductor of the motor. When it is detected that an endpoint value of a rising edge of a V-phase inductance current of the motor reaches a target value, the control chip disconnects the first IGBT module T1 of the n electric drive units, and a fourth IGBT module T4 of the n electric drive units is forward conducted. The external power supply, the terminal N, the second IGBT module T2 of the n electric drive units, the fourth IGBT module T4, and the motor form a discharging loop. The inductor of the motor feeds back electric energy to the external power supply.

Figure 4F:
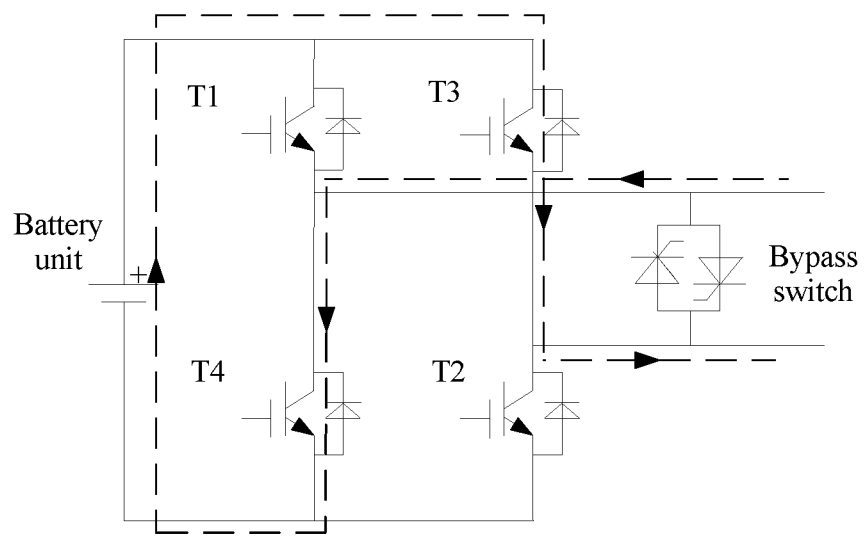
FIG. 4F is a schematic diagram of V-phase discharging of a charging/discharging control apparatus when an external power supply is backward connected to according to a third embodiment of the present disclosure.
Figure 4F:
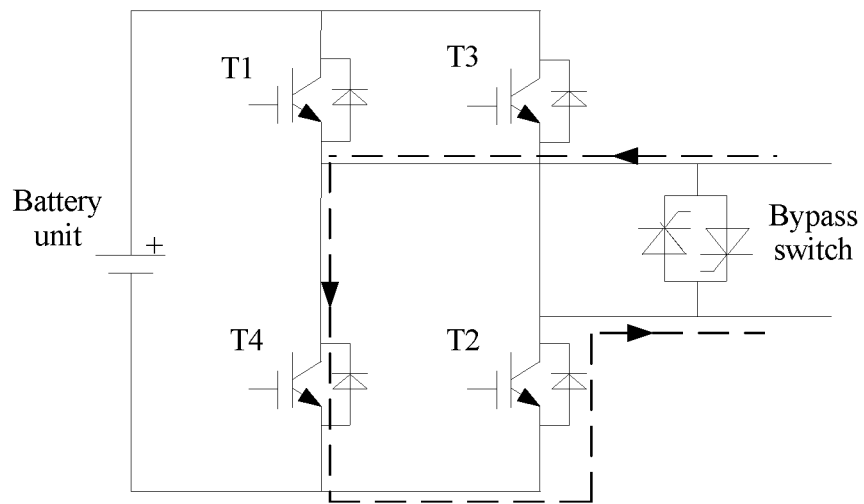

Referring to FIG. 4F, FIG. 4F is a schematic diagram of V-phase discharging of the charging/discharging control apparatus when the external power supply is backward connected to according to the third embodiment of the present disclosure. When an operating mode of the charging/discharging control apparatus is a discharging mode, and a direction of the external power supply is a backward direction, the control chip sends a PWM discharging drive signal to the n electric drive units in the V-phase electric drive circuit of the drive circuit. A fourth IGBT module T4 and a third IGBT module T3 of the n electric drive units are backward conducted. The motor, the terminal N, the fourth IGBT module T4 of the n electric drive units, the n battery units corresponding to the n electric drive units, the third IGBT module T3 of the n electric drive units, and the external power supply form an energy storage loop. The n battery units corresponding to the n electric drive units store energy in the inductor of the motor. When it is detected that an endpoint value of a rising edge of a V-phase inductance current of the motor reaches a target value, the control chip disconnects the third IGBT module T3 of the n electric drive units, and a second IGBT module T2 of the n electric drive units is forward conducted. The motor, the fourth IGBT module T4 and the second IGBT module T2 of the n electric drive units, the terminal N, and the external power supply form a discharging loop. The inductor of the motor feeds back electric energy to the external power supply.

Optionally, in this embodiment of the present disclosure, the external power supply is a direct current power supply or an alternating current power supply.

The electric drive unit control chip includes at least a sampling unit and a drive unit.

The battery voltage sampling circuit, the charging/discharging current sampling circuit, and the source voltage sampling circuit are connected to the sampling unit.

The drive circuit is connected to the drive unit.

Optionally, in this embodiment of the present disclosure, the charging/discharging current sampling circuit detects the three-phase charging/discharging currents of the charging/discharging control apparatus using a Hall current sensor, or the charging/discharging current sampling circuit detects the three-phase charging/discharging currents of the charging/discharging control apparatus using a resistor and an isolation operational amplifier.

In the charging/discharging control apparatus described in FIG. 4A, the control chip of the charging/discharging control apparatus is configured to send a first PWM drive signal to the electric drive circuit, store electric energy of the external power supply in the inductor of the motor, and charge the battery using the electric energy stored in the inductor of the motor, or the control chip is configured to send a second PWM drive signal to the electric drive circuit, store electric energy of the battery in the inductor of the motor, and feed back the electric energy to the external power supply using the electric energy stored in the inductor of the motor. The charging/discharging control apparatus provided in this embodiment of the present disclosure implements charging and discharging control of the battery using the electric drive circuit. The electric drive circuit has relatively large power, thereby increasing charging/discharging power of the charging/discharging control apparatus. In addition, the motor and the control chip of the charging/discharging control apparatus share the electric drive circuit, and a car charger does not need to be independently deployed, to help reduce costs of the charging/discharging control apparatus and reduce a floor area.

The charging/discharging control apparatus provided in the embodiments of the present disclosure is described in detail above. In this specification, specific examples are used to describe the principle and implementations of the present disclosure. The descriptions of the foregoing embodiments are merely intended to help understand the method and core idea of the present disclosure. In addition, with respect to the implementations and the application scope, modifications may be made by a person of ordinary skill in the art based on the idea of the present disclosure. Therefore, this specification shall not be construed as a limitation on the present disclosure.

What is claimed is:

1. A charging or discharging control apparatus, comprising:
   an electric drive circuit;
   a motor, wherein a U-phase coupling terminal of the motor is coupled to a U-phase coupling terminal of the electric drive circuit, wherein a V-phase coupling terminal of the motor is coupled to a V-phase coupling terminal of the electric drive circuit, wherein a W-phase coupling terminal of the motor is coupled to a W-phase coupling terminal of the electric drive circuit, and wherein a center tap of the motor is configured to couple to a first charging or discharging terminal of an external power supply;
   a terminal of the electric drive circuit configured to couple to a second charging or discharging terminal of the external power supply, wherein a positive direct current input terminal of the electric drive circuit is configured to couple to a positive electrode of a battery, and wherein a negative direct current input terminal of the electric drive circuit is configured to couple to a negative electrode of the battery;
   a charging or discharging current sampling circuit coupled to the motor and configured to detect three-phase charging or discharging currents of the charging or discharging control apparatus;
   a source voltage sampling circuit configured to detect a voltage of the external power supply, wherein the charging or discharging current sampling circuit and the source voltage sampling circuit are coupled to a control chip; and
   the control chip configured to:
     send a first pulse width modulation (PWM) drive signal to the electric drive circuit to instruct the electric drive circuit to store electric energy of the external power supply in an inductor of the motor and charge the battery using the electric energy stored in the inductor of the motor; or
     send a second PWM drive signal to the electric drive circuit to instruct the electric drive circuit to store electric energy of the battery in the inductor of the motor and feedback electric energy to the external power supply using the electric energy stored in the inductor of the motor,
   wherein when an operating mode of the charging or discharging control apparatus is a charging mode, the control chip of the charging or discharging control apparatus is configured to:
     obtain an input power supply type, a source voltage sampling value, and a charging current detection value;
     calculate the first PWM drive signal based on the input power supply type, the source voltage sampling value, an inductance value of the motor, and an error between the charging current detection value and a target charging current value; and
     perform closed-loop control, based on the first PWM drive signal, to store the electric energy of the external power supply in the inductor of the motor and then transmit the electric energy stored in the inductor of the motor to the battery, and
   wherein when the operating mode of the charging or discharging control apparatus is a discharging mode, the control chip of the charging or discharging control apparatus is configured to:
     obtain the input power supply type, battery energy, feedback power, the source voltage sampling value, and a battery voltage sampling value;
     calculate the second PWM drive signal based on the battery energy, the feedback power, the source voltage sampling value, the battery voltage sampling value, the inductance value of the motor, and an error between a target discharging current value and a discharging current detection value; and
     perform closed-loop control, based on the second PWM drive signal, to store the electric energy of the battery in the inductor of the motor and then transmit the electric energy stored in the inductor of the motor to the external power supply.

2. The charging or discharging control apparatus of claim 1, further comprising:
   a battery voltage sampling circuit coupled to the control chip and configured to detect a voltage of the battery; and
   a drive circuit configured to couple to the electric drive circuit and the control chip.

3. The charging or discharging control apparatus of claim 2, wherein the external power supply comprises a direct current power supply, and wherein the drive circuit comprises a signal isolation circuit and a power amplification circuit.

4. The charging or discharging control apparatus of claim 1, wherein the electric drive circuit comprises:
   a first insulated gate bipolar transistor (IGBT) circuit;
   a second IGBT circuit, wherein an emitter of the first IGBT circuit is coupled to a collector of the second IGBT circuit to form the U-phase coupling terminal of the electric drive circuit;
   a third IGBT circuit;
   a fourth IGBT circuit, wherein an emitter of the third IGBT circuit is coupled to a collector of the fourth IGBT circuit to form the V-phase coupling terminal of the electric drive circuit;
   a fifth IGBT circuit;
   a sixth IGBT circuit, wherein an emitter of the fifth IGBT circuit is coupled to a collector of the sixth IGBT circuit to form the W-phase coupling terminal of the electric drive circuit; and
   a bus capacitor,
   wherein a collector of the first IGBT circuit, a collector of the third IGBT circuit, a collector of the fifth IGBT circuit, and a positive electrode of the bus capacitor are coupled with each other to form the positive direct current input terminal of the electric drive circuit,
   wherein an emitter of the second IGBT circuit, an emitter of the fourth IGBT circuit, an emitter of the sixth IGBT circuit, and a negative electrode of the bus capacitor are coupled with each other to form the negative direct current input terminal and the terminal of the electric drive circuit, and wherein a gate electrode and the emitter of the first IGBT circuit, a gate electrode and the emitter of the second IGBT circuit, a gate electrode and the emitter of the third IGBT circuit, a gate electrode and the emitter of the fourth IGBT circuit, a gate electrode and the emitter of the fifth IGBT circuit, and a gate electrode and the emitter of the sixth IGBT circuit are coupled to a drive circuit.

5. The charging or discharging control apparatus of claim 1, wherein the charging or discharging current sampling circuit is configured to detect three-phase charging or discharging currents of the charging or discharging control apparatus using a Hall current sensor.

6. The charging or discharging control apparatus of claim 1, wherein the charging or discharging current sampling circuit is configured to detect three-phase charging or discharging currents of the charging or discharging control apparatus using a resistor and an isolation operational amplifier.

7. A method for charging or discharging an electric vehicle, comprising:
　sending a first pulse width modulation (PWM) drive signal to an electric drive circuit to instruct the electric drive circuit to store electric energy of an external power supply in an inductor of a motor and charge a battery using electric energy stored in the inductor of the motor; or
　sending a second PWM drive signal to the electric drive circuit to instruct the electric drive circuit to store electric energy of the battery in the inductor of the motor and feedback electric energy to the external power supply using the electric energy stored in the inductor of the motor,
　wherein the electric vehicle comprises:
　　the electric drive circuit;
　　the motor, wherein a U-phase coupling terminal of the motor is coupled to a U-phase coupling terminal of the electric drive circuit, wherein a V-phase coupling terminal of the motor is coupled to a V-phase coupling terminal of the electric drive circuit, wherein a W-phase coupling terminal of the motor is coupled to a W-phase coupling terminal of the electric drive circuit, and wherein a center tap of the motor is configured to couple to a first charging or discharging terminal of the external power supply;
　　a terminal of the electric drive circuit configured to couple to a second charging or discharging terminal of the external power supply, wherein a positive direct current input terminal of the electric drive circuit is configured to couple to a positive electrode of the battery, and wherein a negative direct current input terminal of the electric drive circuit is configured to couple to a negative electrode of the battery;
　　a charging or discharging current sampling circuit coupled to the motor and configured to detect three-phase charging or discharging currents of the electric vehicle; and
　　a source voltage sampling circuit configured to detect a voltage of the external power supply, wherein the charging or discharging current sampling circuit and the source voltage sampling circuit are coupled to a control chip,
　wherein when an operating mode of the electric vehicle is a charging mode, the method further comprises:
　　obtaining an input power supply type, a source voltage sampling value, and a charging current detection value;
　　calculating the first PWM drive signal based on the input power supply type, the source voltage sampling value, an inductance value of the motor, and an error between the charging current detection value and a target charging current value; and
　　performing closed-loop control, based on the first PWM drive signal, to store the electric energy of the external power supply in the inductor of the motor and then transmitting the electric energy stored in the inductor of the motor to the battery, and
　wherein when the operating mode of the electric vehicle is a discharging mode, the method further comprises:
　　obtaining the input power supply type, battery energy, feedback power, the source voltage sampling value, and a battery voltage sampling value;
　　calculating the second PWM drive signal based on the battery energy, the feedback power, the source voltage sampling value, the battery voltage sampling value, the inductance value of the motor, and an error between a target discharging current value and a discharging current detection value; and
　　performing closed-loop control, based on the second PWM drive signal, to store the electric energy of the battery in the inductor of the motor and then transmitting the electric energy stored in the inductor of the motor to the external power supply.

8. The method of claim 7, further comprising detecting a voltage of the battery with a battery voltage sampling circuit.

9. The method of claim 7, further comprising electrically coupling the electric vehicle to the external power supply, wherein the external power supply comprises a direct current power supply.

10. The method of claim 7, further comprising detecting three-phase charging or discharging currents of the electric vehicle with a Hall current sensor.

11. The method of claim 7, further comprising detecting three-phase charging or discharging current of the electric vehicle with a resistor and an isolation operational amplifier.

12. An electric vehicle, comprising:
　an electric drive circuit;
　a motor, wherein a U-phase coupling terminal of the motor is coupled to a U-phase coupling terminal of the electric drive circuit, wherein a V-phase coupling terminal of the motor is coupled to a V-phase coupling terminal of the electric drive circuit, wherein a W-phase coupling terminal of the motor is coupled to a W-phase coupling terminal of the electric drive circuit, and wherein a center tap of the motor is configured to couple to a first charging or discharging terminal of an external power supply;
　a terminal of the electric drive circuit configured to couple to a second charging or discharging terminal of the external power supply, wherein a positive direct current input terminal of the electric drive circuit is configured to couple to a positive electrode of a battery, and wherein a negative direct current input terminal of the electric drive circuit is configured to couple to a negative electrode of the battery;
　a charging or discharging current sampling circuit coupled to the motor and configured to detect three-phase charging or discharging currents of the electric vehicle;
　a source voltage sampling circuit configured to detect a voltage of the external power supply, wherein the charging or discharging current sampling circuit and the source voltage sampling circuit are coupled to a control chip; and the control chip configured to:
- send a first pulse width modulation (PWM) drive signal to the electric drive circuit to instruct the electric drive circuit to store electric energy of the external power supply in an inductor of the motor and charge the battery using the electric energy stored in the inductor of the motor; or
- send a second PWM drive signal to the electric drive circuit to instruct the electric drive circuit to store electric energy of the battery in the inductor of the motor and feedback electric energy to the external power supply using the electric energy stored in the inductor of the motor, wherein when an operating mode of the electric vehicle is a charging mode, the control chip of the electric vehicle is configured to:
- obtain an input power supply type, a source voltage sampling value, and a charging current detection value;
- calculate the first PWM drive signal based on the input power supply type, the source voltage sampling value, an inductance value of the motor, and an error between the charging current detection value and a target charging current value; and
- perform closed-loop control, based on the first PWM drive signal, to store the electric energy of the external power supply in the inductor of the motor and then transmit the electric energy stored in the inductor of the motor to the battery, and wherein when the operating mode of the electric vehicle is a discharging mode, the control chip of the electric vehicle is configured to:
- obtain the input power supply type, battery energy, feedback power, the source voltage sampling value, and a battery voltage sampling value;
- calculate the second PWM drive signal based on the battery energy, the feedback power, the source voltage sampling value, the battery voltage sampling value, the inductance value of the motor, and an error between a target discharging current value and a discharging current detection value; and
- perform closed-loop control, based on the second PWM drive signal, to store the electric energy of the battery in the inductor of the motor and then transmit the electric energy stored in the inductor of the motor to the external power supply.

13. The electric vehicle of claim 12, wherein the electric vehicle comprises a car.

14. The electric vehicle of claim 12, wherein the electric vehicle comprises a truck.

15. The electric vehicle of claim 12, wherein the electric vehicle comprises a motorcycle.

16. The electric vehicle of claim 12, wherein the electric vehicle comprises a bus.

17. The electric vehicle of claim 12, wherein the electric vehicle comprises a mower.

18. The electric vehicle of claim 12, wherein the electric vehicle comprises a snow clearer.

19. The electric vehicle of claim 12, wherein the electric vehicle comprises an agricultural device.

20. The electric vehicle of claim 12, wherein the electric vehicle comprises a construction device.

* * * * *